(12) United States Patent
    Mariathasan et al.

(10) Patent No.: US 9,554,260 B2
(45) Date of Patent: Jan. 24, 2017

(54) SYSTEM AND METHOD FOR DISTRIBUTED MESSAGING AMONG MEMBERS OF A COMMUNITY

(71) Applicant: Alertsz, LLC, Denver, CO (US)

(72) Inventors: Marion Mariathasan, Denver, CO (US); Gracian Mariathasan, Kansas City, MO (US); Robert Lorance, Chandler, AZ (US); Jeffrey Lorance, Austin, TX (US)

(73) Assignee: ALERTSZ, LLC, Denver, CO (US)

( * ) Notice: Subject to any disclaimer, the term of this patent is extended or adjusted under 35 U.S.C. 154(b) by 0 days.

(21) Appl. No.: 14/571,777

(22) Filed: Dec. 16, 2014

(65) Prior Publication Data

US 2015/0172897 A1    Jun. 18, 2015

Related U.S. Application Data

(60) Provisional application No. 61/916,509, filed on Dec. 16, 2013.

(51) Int. Cl.
    *H04W 4/22*    (2009.01)
    *H04W 4/12*    (2009.01)
    *H04M 1/725*   (2006.01)
    *H04M 1/2745*  (2006.01)

(52) U.S. Cl.
    CPC ........... *H04W 4/22* (2013.01); *H04M 1/72541* (2013.01); *H04W 4/12* (2013.01); *H04M 1/274575* (2013.01); *H04M 1/72527* (2013.01); *H04M 1/72552* (2013.01); *H04M 1/72572* (2013.01)

(58) Field of Classification Search
    CPC ........... H04W 4/22; H04W 4/12; H04M 1/725
    See application file for complete search history.

(56) References Cited

U.S. PATENT DOCUMENTS

| | | | |
|---|---|---|---|
| 2008/0166992 A1* | 7/2008 | Ricordi | A61B 5/0002 455/404.2 |
| 2009/0015429 A1 | 1/2009 | Piccioni | |
| 2009/0247111 A1 | 10/2009 | Sennett et al. | |
| 2010/0159871 A1 | 6/2010 | Tester | |
| 2012/0105203 A1 | 5/2012 | Elliot et al. | |
| 2013/0012154 A1 | 1/2013 | Ramos | |
| 2013/0183924 A1 | 7/2013 | Saigh et al. | |
| 2013/0218681 A1 | 8/2013 | Haney | |

OTHER PUBLICATIONS

International Search Report and Written Opinion for US Patent Application No. PCT/US2014/070464, mailed Mar. 17, 2015, 10 pages.

* cited by examiner

*Primary Examiner* — Kamran Afshar
*Assistant Examiner* — Farideh Madani
(74) *Attorney, Agent, or Firm* — Sheridan Ross P.C.

(57) ABSTRACT

According to various embodiments of the present disclosure, a user may receive various information via a personal electronic device ("PED"), based in part on the individuals or contacts with whom the user associates and based in part on the activities, events, or locations with which the user has affiliated. In certain embodiments, the user may receive notifications to the user's PED without preselecting contacts, activities, events or locations. In other embodiments, the user may receive notifications relating to any one of the contacts, activities, events or locations that the user has preselected. Systems and associated methods for implementing and practicing the present disclosure are also described.

12 Claims, 15 Drawing Sheets

Community #1

Community #2

SYSTEM AND METHOD FOR DISTRIBUTED MESSAGING AMONG MEMBERS OF A COMMUNITY

CROSS-REFERENCE TO RELATED APPLICATION

This application is a non-provisional application claiming priority to U.S. Ser. No. 61/916,509, entitled "System and method for distributed messaging among members of a community," filed on 16 Dec. 2013, the entire disclosure of which is herein incorporated by reference.

TECHNICAL FIELD

This invention generally relates to systems for allowing individuals within a selected community and/or geographic area to issue and receive information regarding events relevant to members within the community and/or geographic area.

BACKGROUND OF INVENTION

A variety of systems exist today for allowing a person to summon help, or otherwise raise an alarm. For example, home-based alarm systems sometimes have a panic button, which the homeowner can press to set off the alarm siren and/or to summon help, say from a police, fire or medial department. Prior art systems may comprise a transportable alarming device, particularly for use by persons who have a disability or potentially serious medical condition, which may be worn on the person and may communicate with a base unit in the home. If the person experiences an emergency or other difficulty, they may trigger the alarming device, which typically communicates via a base unit comprising a remote monitoring service. However, one disadvantage of these types of system is that their range of operations is generally restricted to within the person's home, or its immediate surroundings.

The Emergency Alert System (EAS) is a national warning system in the United States put into place on Jan. 1, 1997, and supersedes the Emergency Broadcast System (EBS), which itself superseded the CONELRAD System. EAS messages are transmitted via AM, FM, Broadcast television, Cable television and Land Mobile Radio Service, as well as VHF, UHF, and FiOS (wireline video providers). Digital television, Satellite television and digital cable providers, along with Sirius XM satellite radio, IBOC, DAB and digital radio broadcasters have been required to participate in the EAS since Dec. 31, 2006. DirecTV, Dish Network and all other DBS providers have been required to participate since May 31, 2007. In 2008 the FCC began work on another system for public alerting designed and targeted at smart phones, meant to support the EAS. The Commercial Mobile Alert System made its debut in about early 2013 in select states for select events. While these systems enhance emergency event reporting, there presently are no systems available for an individual user to both access and supplement the content broadcast by these systems.

Many people today also have a personal cellular or mobile telephone, which allows them to summon help by calling another person or a police/emergency responder dispatch. In addition, many cellular telephones automatically report the location of the caller to the dispatch, as determined by a GPS feature in the telephone. However, a limitation of calling a 911 service is that it can only be used after an emergency, such as when an injury, risk or distress has occurred, and is only received by the dispatcher or other person contacted by the person experiencing the emergency.

Further aggravating these current limitations is the fact that many emergency responders and public agencies are underfunded, understaffed, and do not have the capacity to respond to a large number of people requesting their services, particularly during emergency events affecting more than a few individuals. Even when public agencies are able to respond quickly, people may also want to make their family and/or friends aware of potential danger, or potentially update their contacts with respect to their status or condition.

Using current systems, there is no effective way to send a targeted alert to people who need to be made aware of dangerous situations, acts of crime/terrorism, natural disasters or other emergency situations. Natural disasters, for example, include but are not limited to disasters that occur through natural means, such as blizzards, floods, tornadoes, hurricanes, volcanic eruptions, earthquakes, heat waves, landslide, etc. Other emergency situations may be non-naturally occurring situations, such as kidnapping, civil unrest, criminal activity and or terrorist activity, for example. These situations can and often do occur with little warning and early awareness to those individuals within the immediate area of danger. The immediate availability of pertinent information to emergency responders is also often critical to containing the damage or preventing escalation.

Thus, there is a long felt need to provide a customizable alert system that an individual or group of individuals within a community and/or geographic area may utilize to quickly and timely obtain relevant information regarding their community and/or geographic area. In addition, there is a need for such a system that also allows the individual users of an alert notification system to quickly and easily send out relevant information to the other individuals that are also members of the community and/or are located in specific geographic areas of choice, including to early responders or other emergency responders.

BRIEF DESCRIPTION OF THE DRAWINGS

The accompanying drawings, which are incorporated in and constitute a part of the specification, illustrate embodiments of the disclosure and together with the general description of the disclosure given above and the detailed description of the drawings given below, serve to explain the principles of the disclosures.

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

DETAILED DESCRIPTION OF EMBODIMENTS

Figure 1:
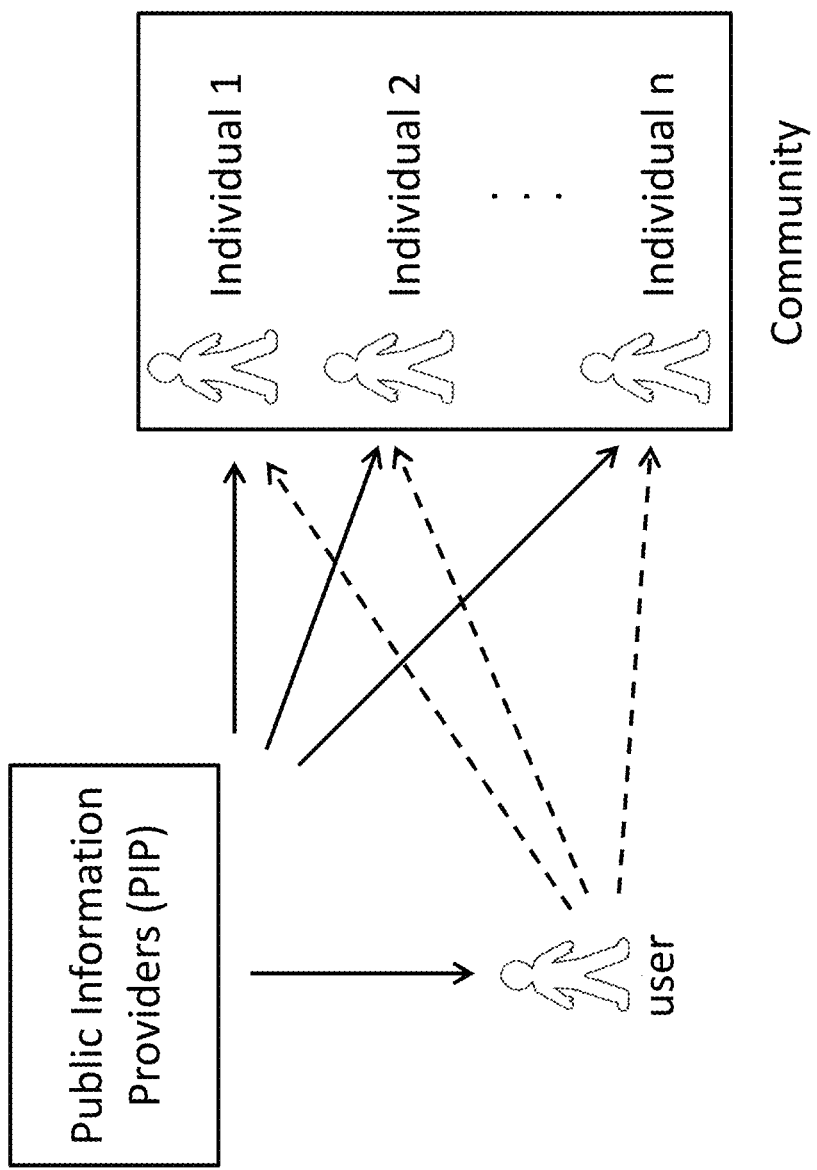
FIG. 1 is an illustration of an information-sharing system according to embodiments of the present disclosure.

The following detailed description illustrates the invention by way of example and not by way of limitation. This description will clearly enable one skilled in the art to make and use the invention. Additional information is provided in the appended illustrations, which are labeled FIGS. 1-8H, and supplement this specification and serve to further illustrate the various embodiments of the present disclosure.

The present disclosure generally relates to systems for allowing individuals within a selected community and geographic area to issue and receive information regarding events relevant to the community and geographic area.

To reduce the need to provide extensive disclosure in this application, but to provide adequate written description of the various devices and methods encompassed by the numerous embodiments of the present disclosure, various patents are incorporated herein in their entireties this reference. It will be appreciated by one of skill in the art that various structural elements can be combined with the present structure of the present disclosure to achieve various desired purposes. Therefore, each of the following are incorporated herein by reference in their entirety: U.S. Patent Application Publication Nos. 2009/0015429, 2009/0247111, 2010/0159871, 2012/0105203, and 2013/0012154.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the invention is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention may be separately claimed.

As used herein, the term "post" refers to non-emergency types of messaging that people send to only their contacts. For example, a user can send a post to their neighbors about a garage sale they are having.

As used herein, the term "sighting" refers to events that are non-emergency in nature for the user sending the alert. However, sightings are designed for the person sending the alerts to make others in the community aware of a situation at the exact location and for those in a predefined distance from their exact location. For example, a person witnesses a hit-and-run. The "sighting" post will select one of many predefined alerts "hit-and-run" and enters a short description (optional)—say "blue car" so that others in the vicinity can be on the lookout. Sightings are by default sent as a push notification to everyone with a predefined distance from where the post originated. The poster's "connections" on the app will preferably receive all "sightings" for the selected circle(s) as well, even outside the predefined distance. According to a preferred embodiment, sightings will also be sent to every user within a predefined distance from the alert sender. Connections may alternatively elect to change the settings and not receive "sightings" if they do not wish to receive non-critical alerts.

As used herein, the term "emergency" refers to events that pose imminent dangers for the user sending the alert or imminent dangers for the community. For example, a person whose house gets broken into can quickly click the emergency button on their phone. An emergency alert is preferably sent to all of the user's configured In Case of Emergency (ICE) circle/connections, but in a preferred embodiment will also be sent to every user within a predefined distance from the alert sender.

One aspect of the present disclosure is an executable computer program and associated logic, preferably including computer executable instructions stored onto a computer readable medium which, when executed by a user of a personal electronic device (PED), causes the PED to perform a method of sharing information with other user-selected PEDs that also utilize the computer program product, the computer program product comprising executable instructions for the user to define the user-selected PEDs, executable instructions that enable the PED of the user to receive information from the user-selected PEDs, and executable instructions that enable the user to send information to the user-selected PEDs. The user can initiate the executable instruction to send information, whereby specific information of choice is sent from the user's PED to each of the user-selected PEDs and when any of the user-selected PEDs initiate the executable instruction to send information, the executable instructions to receive information, enable the PED of the user to receive the information sent.

In yet another embodiment of the present disclosure, the user may receive various information, preferably based in part on the contacts with whom the user associates and based in part on the activities, events, or locations with which the user has affiliated. In certain embodiments, the user may receive notifications to the user's PED without preselecting contacts, activities, events or locations. In other embodiments, the user may receive notifications relating to any one of the contacts, activities, events or locations that the user has preselected. Furthermore, the user may elect to share the notifications, either manually or automatically, with other contacts, including through the use of social media, by way of example.

In further embodiments of the present disclosure, one or more executable computer programs may further comprise executable instructions that preferably enable the user of the PED to select at least one public information provider (PIP), and executable instructions that enable the user of the PED to receive information from the at least one PIP, wherever the PIP transmits information, wherein each of the user-selected PEDs also receive the information transmitted by the at least one PIP.

In some embodiments of the present disclosure, a user may select at least one public information provider (PIP), preferably selected from the group consisting of the Emergency Alert System (EAS), the Emergency Broadcast System, the National Weather Service (NWS), the Public Safety and Homeland Security Bureau of the Federal Communications Commission, the Federal Emergency Management Agency (FEMA), the Integrated Public Alert Warning System, the National Warning System (NAWAS), the Commercial Mobile Alert System (CMAS), AMBER alerts, the Center for Disease Control and Prevention, and any other local, state or federal governmental agency, educational institutions, and private and/or for-profit organizations, such as security system providers (e.g. ADT), alert providers (e.g. UMS, CTIA), medical alert providers, or any other business that provides relevant information.

In one embodiment, the user preferably receives notifications relevant to a preselected venue. By way of example but not limitation, the user may elect to receive notifications via the user's PED which relate to or are within a certain radius from an educational institution that their children attend. In this example, the user would receive notifications and potentially share those notifications despite the location of the user, and instead would receive notifications due to their interest in the venue selected. Other possible venues include airports, bus stations, train stations, commercial ports, interstate highways, major intersections, shopping malls, ski resorts, public venues such as football stadiums, outdoor arenas, amusement parks, offices or other business facility. A venue can be followed as a "place of interest" for receiving posts by various methods, such as searching for an address or placing a push pin via a map page, by way of example.

In further embodiments, notifications may be received, preferably based solely or in part on the user's geographic location or proximity to a place of interest. For example, the executable program may access the GPS or GLONASS locator on the user's PED and determine from the user's location the area in which notifications should be sent. Accordingly, the user may automatically receive only those notifications that are within a predetermined distance from the user's actual location at the time of the emergency or other event giving rise to the notification. In still further embodiments of the present disclosure, the executable program may further comprise executable instructions that enable the user of the PED to select at least one geographic area of interest, wherein when any user-selected PED and PIP transmits information, the user's PED and the remaining user-selected PEDs receiving the transmitted information.

In some embodiments of the present disclosure, a system for sending and receiving information alerts may comprise a follow feature. A follow feature is preferably designed for individuals and organizations to receive alerts from businesses, educational institutions and governmental agencies. By clicking the "follow" button, a user is able to receive specific or generic updates at a selected frequency. In a preferred embodiment, when a business, educational institution or governmental agency "follows" the user, then that user is deemed either an employee or "part of" the organization which means the user is now capable of receiving "internal" alerts—not meant for the general public. In this manner, users of the system may be associated with businesses, institutions or agencies that they are likely to be interested in There may be a companion website for organizations to administer settings, conduct maintenance, and send messages to followers.

In some embodiments of the present disclosure, a system for sending and receiving information alerts may comprise a feature for defining a group of individuals, circle of contacts, collection of user-selected personal electronic devices, etc. A circle of contacts may comprise family members, friends, co-workers, colleagues, team members, or any group of individuals selected by a user of the system. Preferably, the user may select any group of people he or she wishes to be connected with regarding the sharing of information. Information shared can be any conceivable information that a group of people or community may be interested in. For example, information shared by public information providers may include, but is not limited to, weather alerts, crime alerts, alerts regarding acts of terrorism, AMBER alerts, traffic alerts, government agent bulletins, etc. Information shared by individuals belonging to a community or group may include text alerts, tweets, emails, video, still images, voice recordings, and any other suitable media that can be stored and transmitted electronically.

In some embodiments of the present disclosure, a system for sharing information may comprise at least one community. In further embodiments, and in particular referring in detail to FIGS. 3-4, a system for sharing information may preferably comprise 1, 2, 3, or any multiple of communities.

The user may for example wish to define a first community of individuals that comprises just close family and friends, and a second community of individuals that comprises co-workers. In still further embodiments, the user may define communities according to geographic location or venue, as discussed above.

In some embodiments of the present disclosure, the user may preferably define different alert levels. For example, a low alert level may only include information from public information providers related to traffic updates. A medium alert level may include severe weather reports. A high alert level may include AMBER alerts, crime, and terrorism alerts. In still further embodiments of the present disclosure, the user may define different alert levels for different communities. For example, a user may select a community comprising close family members and friends to just receive high alert levels (e.g. crime, acts of terrorism), and select a community comprising co-workers low alert levels (e.g. traffic updates and weather).

An example of how a software product of the current invention may be used includes the followings preferable steps: 1) Download the application; 2) Create an account or login with a social media site or other registration service (such as SoRewarding or Facebook); 3) Create circles and/or connections by utilizing the phone's address book or other listing of contacts (ICE, family, friends, neighbors, co-workers, etc); 4) Create areas and/or places of interest by entering the physical addresses of locations you would like to be notified of in the event of emergencies at or near these locations; 5) Select the notification options that best suit the 'user's needs; 6) Select whether to "follow" local, state and federal organizations or other notification services (such as Homeland security, TSA, Local police departments, etc.) and elect to receive real-time alerts as they are published; 7) Select whether to receive news alerts from various media outlets around crime and other pertinent information to keep the user updated and safe; 8) Select whether to publish "Sightings" or "Emergencies" observed by the user; and 9) Select the frequency at which the user stays updated within the selected communities and notification services.

In some embodiments of the present disclosure, a system for sending and receiving information alerts may further comprise a wristband which preferably has the ability for the user of the wristband to send out an SOS signal to at least one other individual selected to belong to at least one of the user's communities. In some embodiments, the wristband user registers the bracelet with their personal electronic device (PED) of choice; e.g. smart phone, tablet, lap-top computer, etc. In the event of an emergency, the user presses an SOS button on the wristband. The wristband then relays an SOS distress signal to the user's PED, and the user's PED then relays an alert to all of the user's contacts on their application and personal device of choice as well as to others within a predefined distance of where the user pressed the SOS button or buttons. The wristband may communicate with the user's PED by any of several wireless communication means, including but not limited to Bluetooth, and may preferably be compatible with a wide range of smart-phone operating systems, including but not limited to one or more versions of iOS and Android. In some embodiments, the wristband may be powered by a rechargeable battery, and may preferably be compatible with standard USB ports. In some embodiments, the wristband may have a means for notifying a user when the battery is low and should be recharged. In some embodiments, the wristband may be made of a durable material, including but not limited to silicone, and may be water-resistant or waterproof.

In some embodiments of the present disclosure, a system for sending and receiving information alerts may further comprise a home siren. The home siren is a device which can be plugged into a standard wall outlet and which makes a loud sound when a user presses an SOS button on the user's wristband or PED. The loud sound may have a volume of about 85 decibels, comparable to that of a home smoke detector, and may have a tone or pattern which distinguishes it from sounds made by other home alarm systems, e.g. smoke detectors, carbon monoxide detectors, burglar alarms, etc. The home siren may have a silence button, whereby the loud sound is silenced when a user presses the silence button. The home siren may be "paired" with multiple devices, in some embodiments a maximum of about eight devices, such that the loud sound is activated when the SOS button on any of the "paired" devices. The home siren may communicate with "paired" devices by any of several wireless communication means, including but not limited to Bluetooth. In some embodiments, the home siren may have a battery backup that engages when the devices loses power from the wall outlet, ensuring that the device remains operable during power outages. The battery backup may be serviceable by a user, and may include a means for notifying a user when the battery is low and should be changed.

In some embodiments of the present disclosure, a "feed" may be provided. As used herein, the term "feed" refers to a page where all posts of interest to a user are displayed. A feed may display one or more of all posts from other users in a circle, all posts from contacts, emergency and sighting posts within a configured geographical radius, posts from followed organizations, and notices when one of the user's contacts has installed and configured the app so that the user is prompted to add the contact to a circle. The feed may be filtered or secured to display only posts from contacts in the user's circles, except for geographical emergency and sighting posts.

Referring now to FIG. 1, at least one public information provider (PIP) transmits information to a user. The PIP also transmits information to each of N individuals, the individuals collectively forming a community. The user may also transmit information to each of the individuals of the community.

Figure 2:
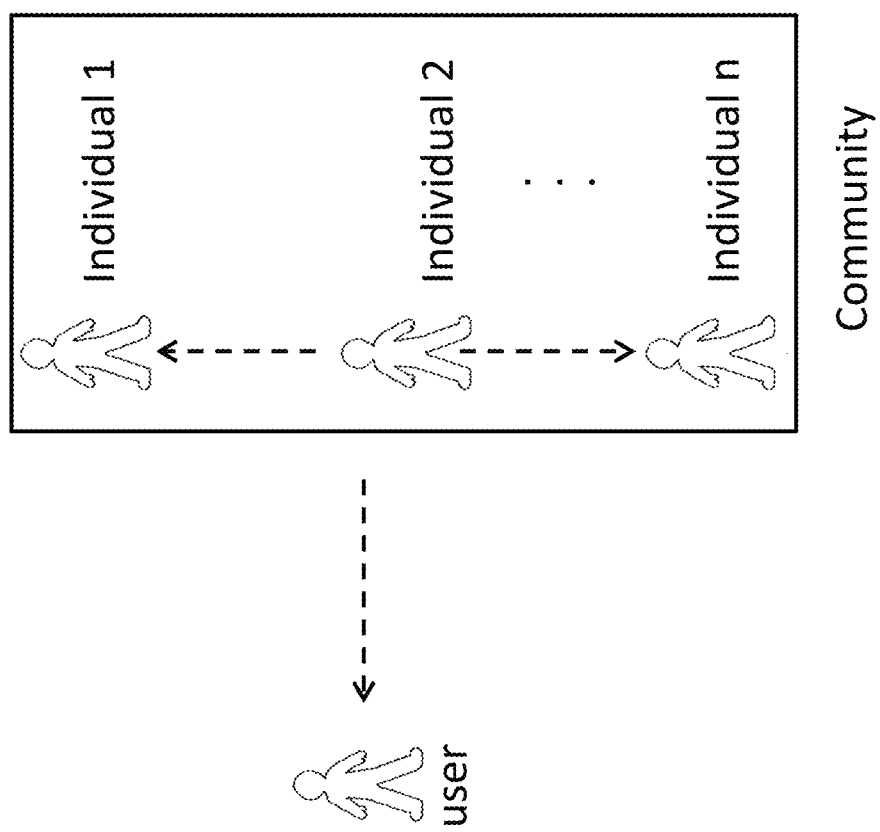
FIG. 2 is an illustration of a transmission of information from a community to a user according to embodiments of the present disclosure.

Referring now to FIG. 2, the user may receive information from the community. Each of the individuals in the community may also send or receive information to or from each of the other individuals in the community.

Figure 3:
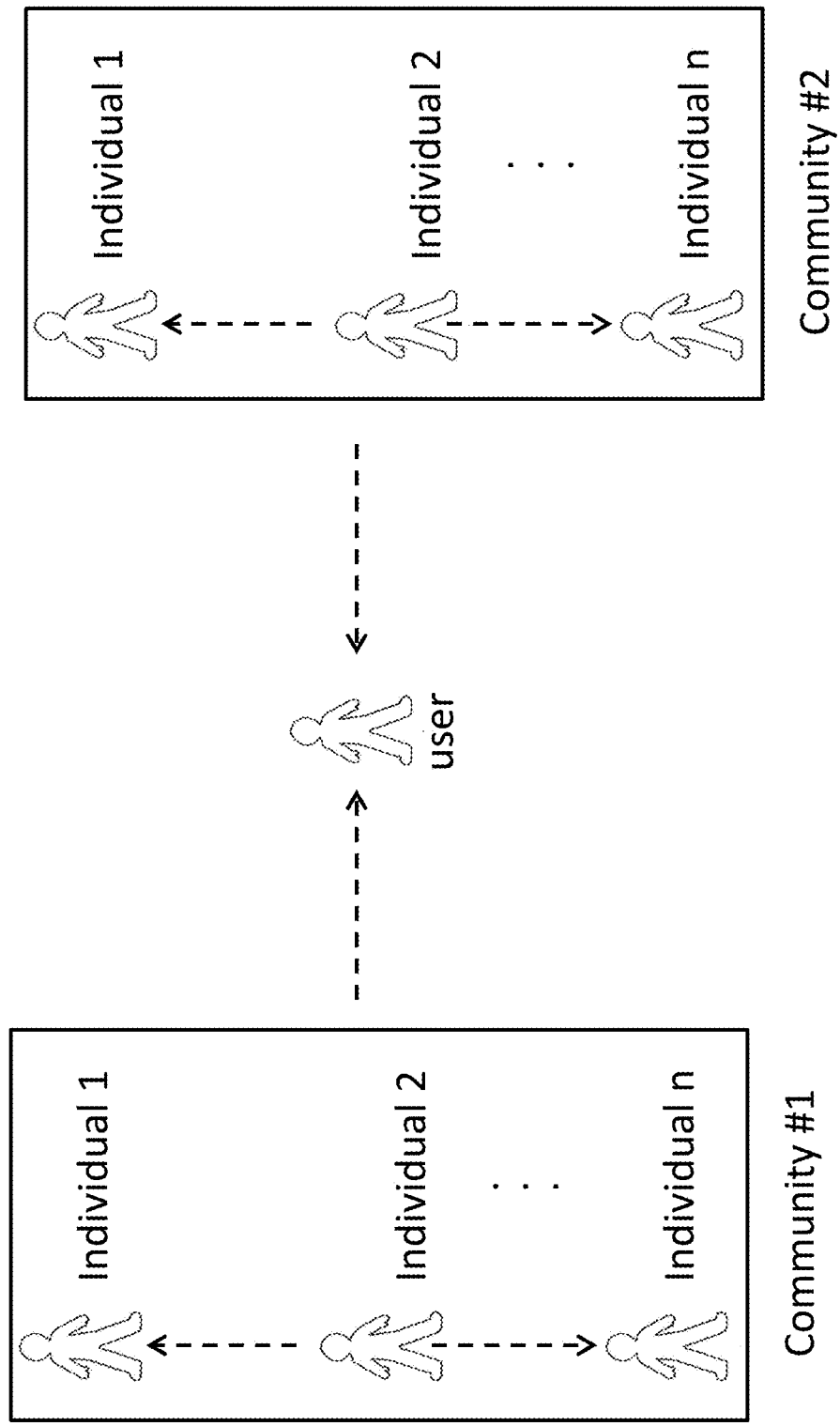
FIG. 3 is an illustration of transmissions of information from multiple communities to a user according to embodiments of the present disclosure.

Referring now to FIG. 3, the user may receive information from a first community and a second community, each made up of N individuals. Each of the individuals in the first community may also send or receive information to or from each of the other individuals in the first community, and each of the individuals in the second community may also send or receive information to or from each of the other individuals in the second community.

Figure 4:
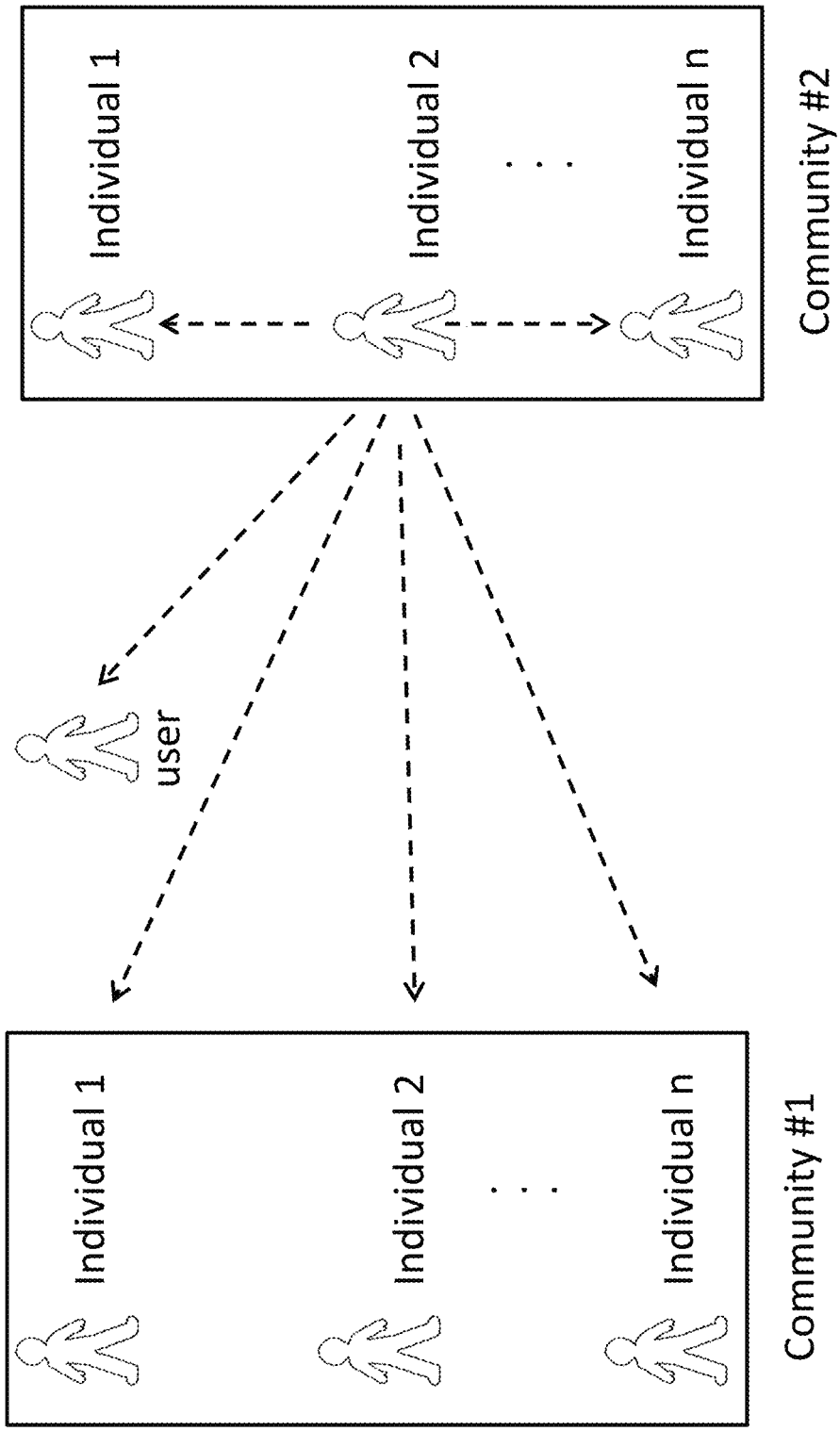
FIG. 4 is an illustration of an information-sharing system according to embodiments of the present disclosure.

Referring now to FIG. 4, the user may receive information from the second community, which also transmits information to the first community. Each of the individuals in the first community receives the information transmitted from the second community. As before, each of the individuals in the second community may also send or receive information to or from each of the other individuals in the second community.

Figure 5:
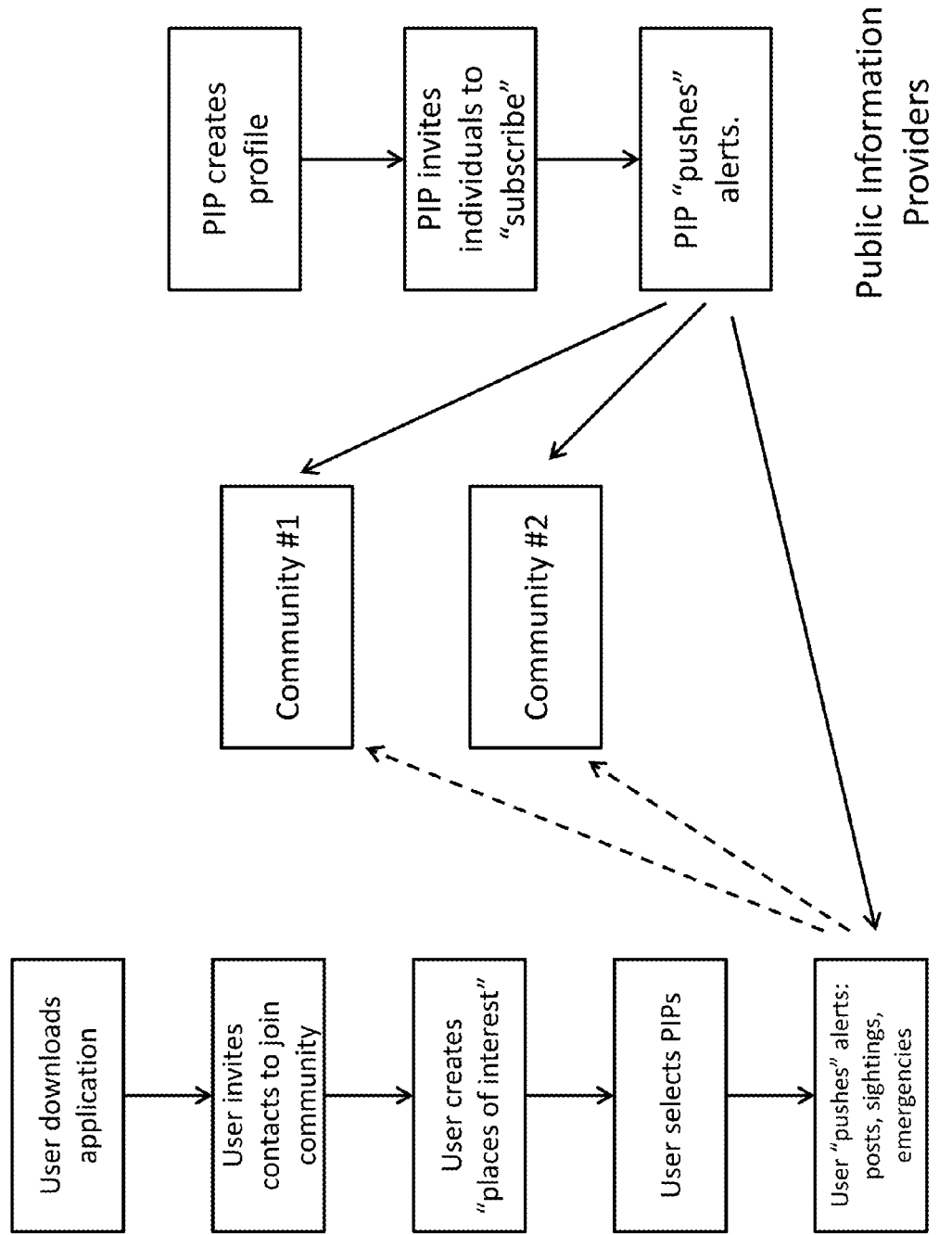
FIG. 5 is a diagram of methods of using an information-sharing system according to embodiments of the present disclosure.

FIG. 5 illustrates how the user and the PIPs each utilize embodiments of the present disclosure. The user downloads an application, invites contacts to join a community, and creates places of interest. Meanwhile, each PIP creates a profile and invites individuals to subscribe. A user can then select a PIP and choose to subscribe to it. When the PIP pushes an alert, the users who have subscribed to that PIP, as well as first and second communities, receive the alert. Users can also push alerts, such as posts, sightings, or emergencies, to the first and second communities. It is expressly understood that the order of steps described in relation to this FIG. 5 may vary according to different embodiments of the present disclosure.

Figure 6:
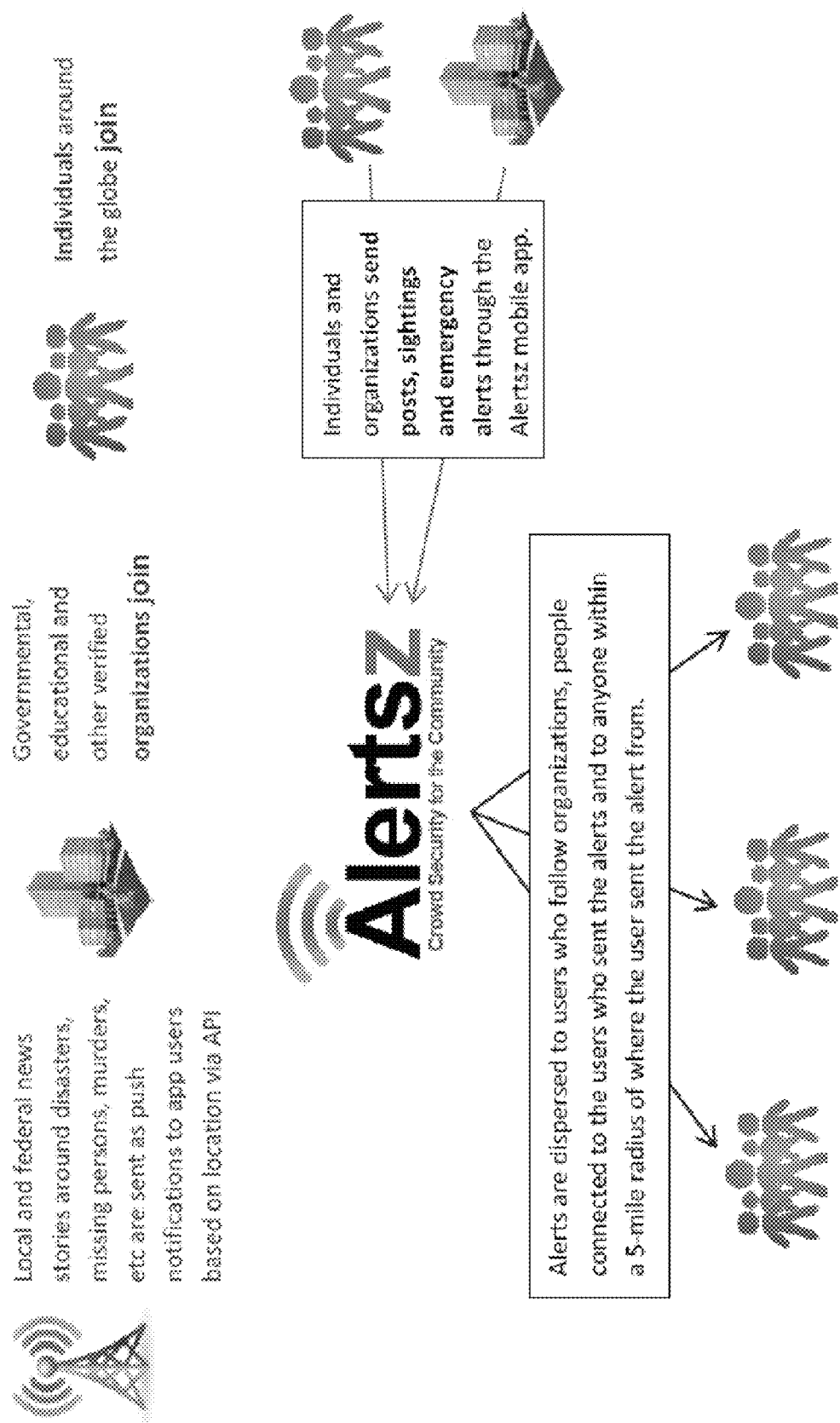
FIG. 6 is an illustration of methods of using an information-sharing system according to embodiments of the present disclosure.

FIG. 6 further illustrates uses for embodiments of the present disclosure. Local and national news stories concerning disasters, missing persons, murders, etc. are sent as push notifications to app users based on location via API. Additionally, governmental, educational, and other verified organizations, as well as individuals, join a community. Individuals and organizations then send posts, sightings, and emergency alerts through a mobile app. Alerts are dispersed to users who follow organizations, people connected to the users who sent the alerts, and anyone within a five-mile radius of the location from which the user sent the alert.

Figure 7:
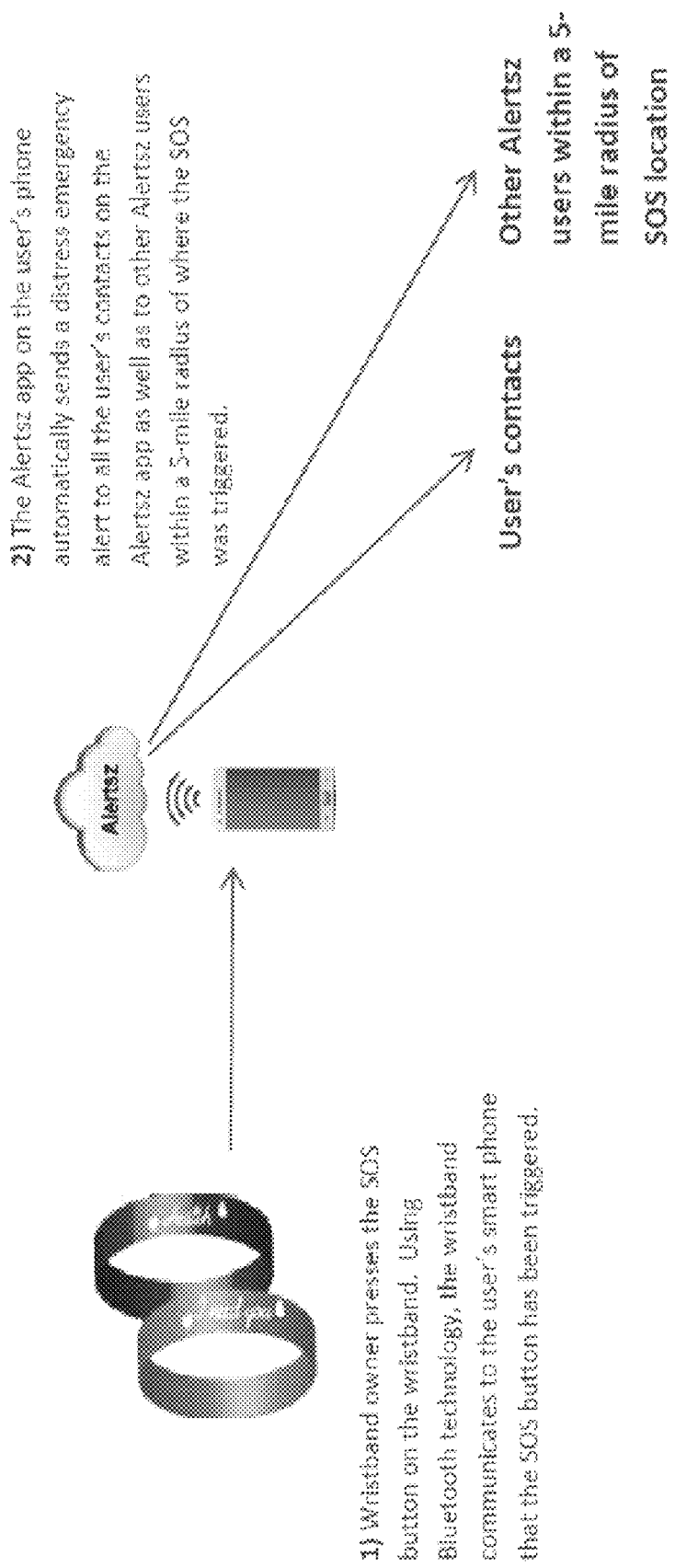
FIG. 7 is a diagram of a method for sending an alert according to embodiments of the present disclosure.

FIG. 7 illustrates uses for embodiments of the present disclosure which comprise a wristband. An owner of a wristband presses an SOS button on the wristband. Using Bluetooth technology, the wristband communicates to a smart phone of the user that the SOS button has been triggered. An app on the smart phone automatically sends a distress emergency alert to all of the user's contacts through the app, as well as to other users of the app within a five-mile radius of where the SOS button was pushed.

At a user's mobile or "client" device, the display page may be interpreted by software residing on a memory of the client device, causing a file to be displayed on a video display in a manner perceivable by a user. The display pages described herein may be created using a software language known in the art such as, for example, the hypertext markup language ("HTML"), the dynamic hypertext markup language ("DHTML"), the extensible hypertext markup language ("XHTML"), the extensible markup language ("XML"), or another software language that may be used to create a computer file displayable on a video display in a manner perceivable by a user. Any computer readable media with logic, code, data, instructions, may be used to implement any software or steps or methodology. Where a network comprises the Internet, a display page may comprise a webpage of a type known in the art.

A display page according to the invention may include embedded functions comprising software programs stored on a memory, such as, for example, Cocoa, VBScript routines, JScript routines, JavaScript routines, Java applets, ActiveX components, ASP.NET, AJAX, Flash applets, Silverlight applets, or AIR routines.

A display page may comprise well known features of graphical user interface technology, such as, for example, frames, windows, tabs, scroll bars, buttons, icons, menus, fields, and hyperlinks, and well known features such as a touch screen interface. Pointing to and touching on a graphical user interface button, icon, menu option, or hyperlink also is known as "selecting" the button, icon, option, or hyperlink. Any other interface for interacting with a graphical user interface may be utilized. A display page according to the invention also may incorporate multimedia features.

A user interface may be displayed on a video display and/or display page. A server and/or client device may have access to data management and/or associated software. A user interface may be used to display or provide access to medical data. For example, a user interface may be provided for a web page or for accessing the application(s) described herein. A particular application may be accessed remotely or locally. A user interface may be provided for a mobile application (e.g., iPhone application), gadget, widget, tool, plug-in, or any other type of object, application, or software.

Figure 8A:
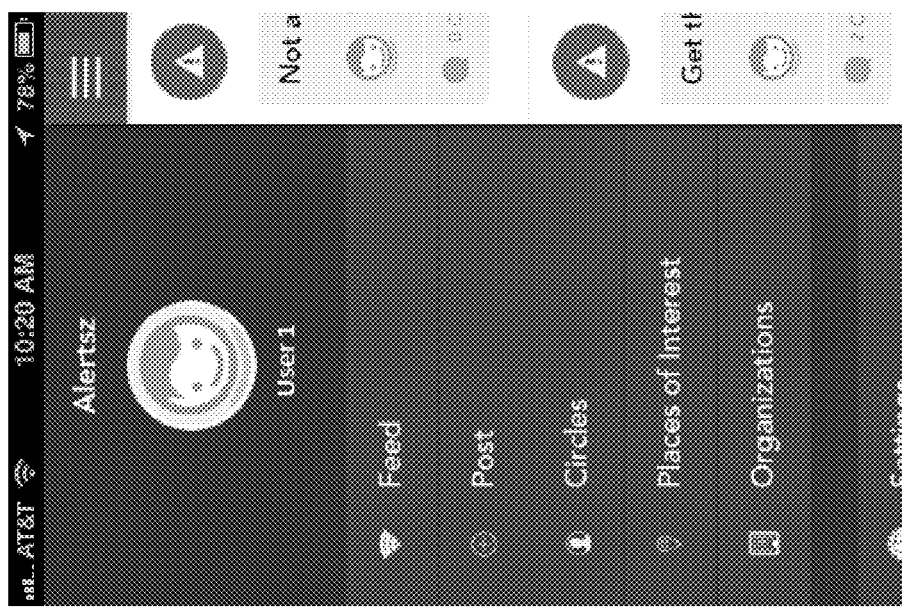
FIGS. 8A-8H are views of pages of a smartphone app according to embodiments of the present disclosure.

FIG. 8A illustrates a graphical display page according to one embodiment of the present disclosure. According to this embodiment, the graphical display page may comprise a "menu" or listing of a smartphone application. The menu displays an identifying image specific to a user, as well as graphical user interface buttons which the user may press to filter posts displayed by the app. In this embodiment, the menu comprises a "Feed" button which allows the user to see posts, a "Post" button which allows a user to send a post, a "Circles" button which allows the user to organize other preselected users, a "Places of Interest" button which allows the user to select locations from which the user wishes to see posts, and an "Organizations" button which allows the user to select organizations, for example PIPs, from which the user wishes to see posts. Additional graphical display pages, according to preferred embodiments of the present disclosure, are shown in FIGS. 8B-H and described below.

Figure 8B:
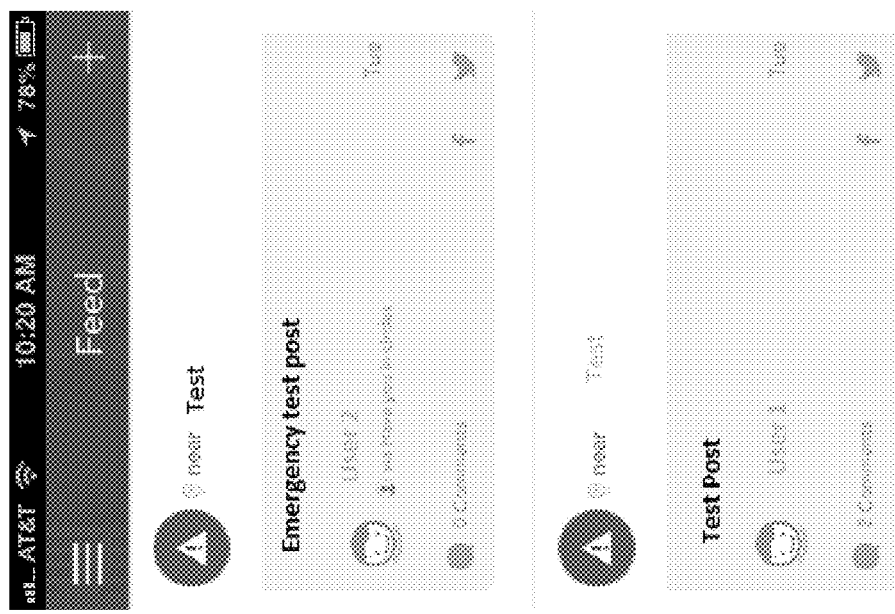

FIG. 8B illustrates a "feed" displayed on a smartphone app according to embodiments of the present disclosure. The feed displays posts sent by users of the smartphone app. The app identifies the location from which the post was sent, a post title or other post text, an image and a name that identify the user who sent the post, and the time of the post. Graphical user interface button allow the user viewing the post to respond to the post with a comment and view the comments of other users of the app, or to share the post via social media, for example on Facebook or Twitter.

Figure 8C:
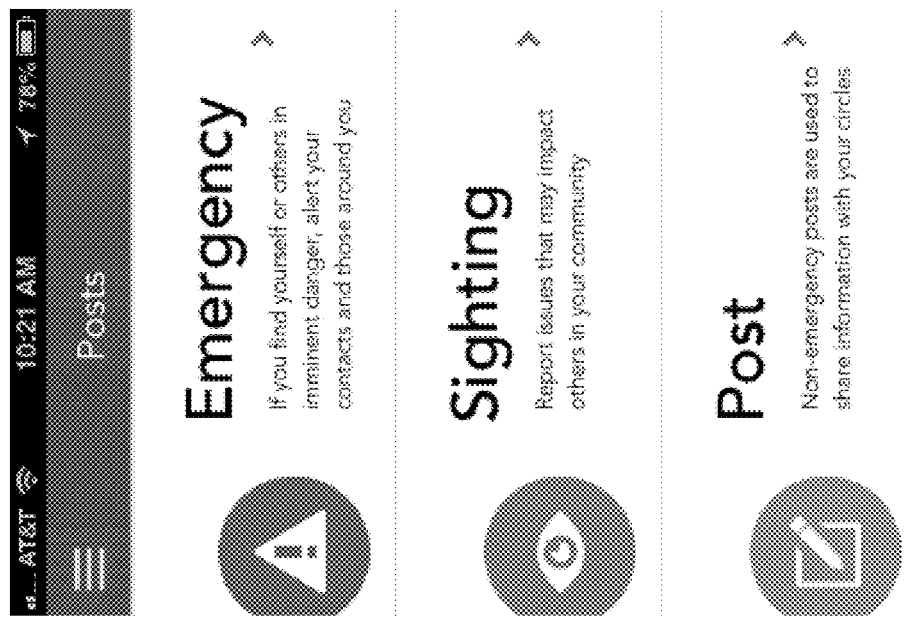

FIG. 8C illustrates a "post" page displayed on a smartphone app according to embodiments of the present disclosure. The page provides graphical user interface buttons that allow the user to send any of several different types of post. The page provides an "Emergency" button, which allows the user to send a post alerting the user's contacts, as well as other users of the smartphone app within a geographic radius, in case of danger. The page also provides a "Sighting" button, which allows the user to send a post reporting issues of interest to the community. The page further provides a "Post" button, which allows the user to share non-emergency information with at least one group of preselected other users of the app.

Figure 8D:
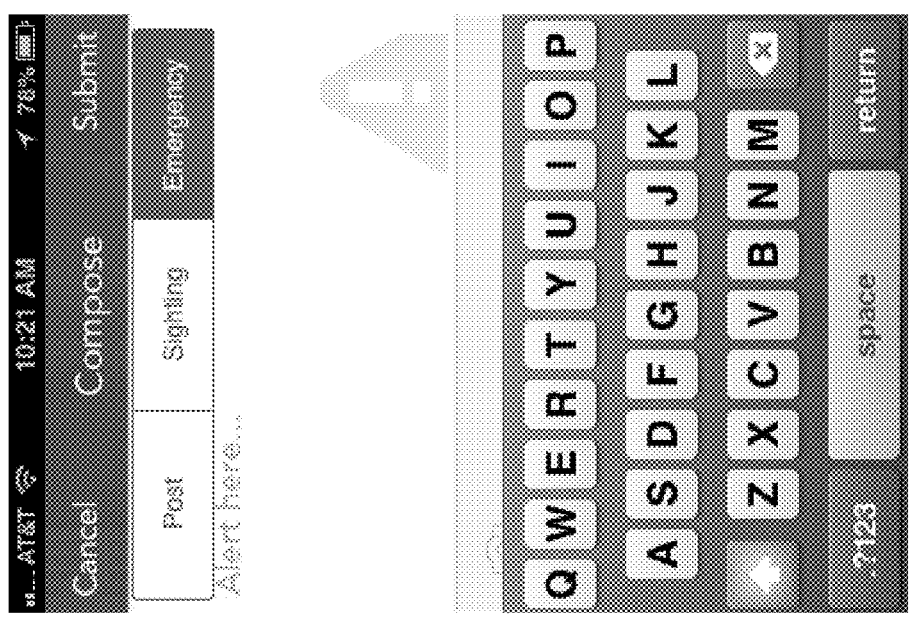

FIG. 8D illustrates a "compose" window displayed on a smartphone app according to embodiments of the present disclosure. This page may be displayed when the user presses a button on the "post" page. The page displays which of the several types of post the user is composing and provides an area for typing a message associated with the post. The user may input the message using the smartphone's standard keyboard. The page comprises a "submit" button that will cause the post to be sent, as well as a "cancel" button if the user decides not to send the post.

Figure 8E:
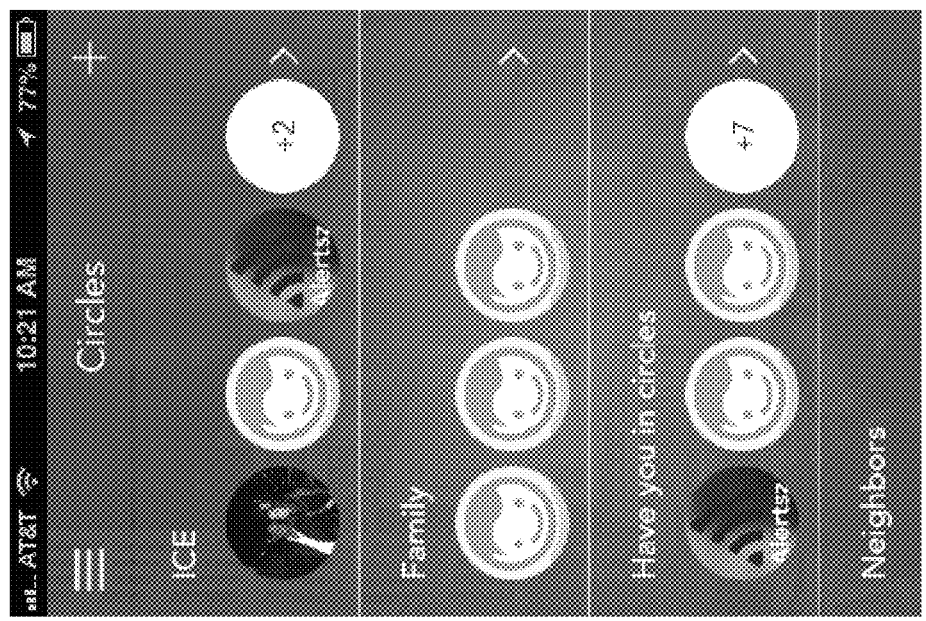

FIG. 8E illustrates a "circles" page displayed on a smartphone app according to embodiments of the present disclosure. The page allows a user to select and organize contacts into communities, or "circles." The user may elect to send or receive different types of posts to or from the contact of each circle. Each contact is identified by an identifying image. In this example, the page displays an "ICE" (In Case of Emergency") circle, a "Family" circle, a "Have you in circles" circle, and a "Neighbors" circle. The user may use a user interface to place a contact into one or more circles.

Figure 8F:
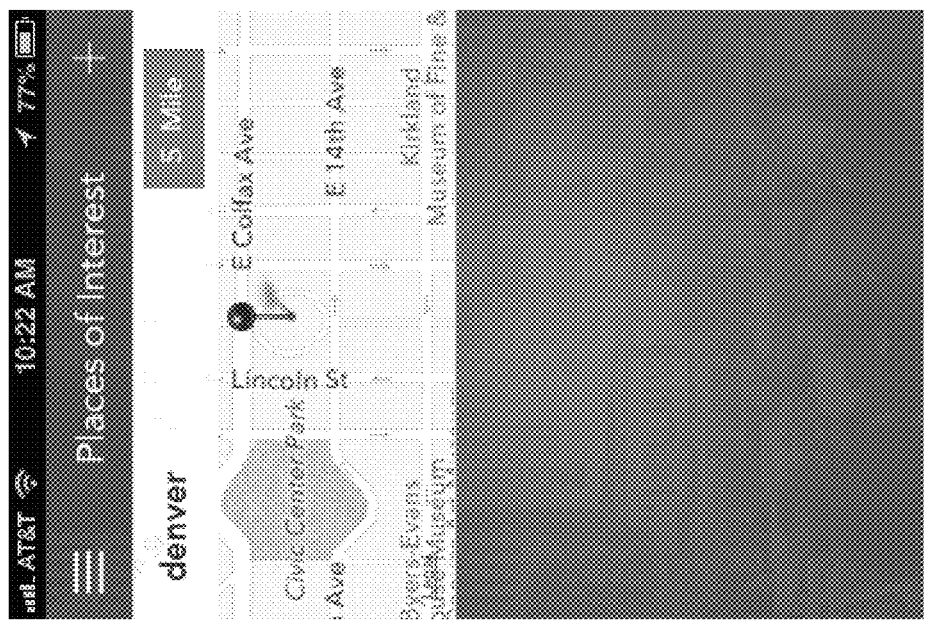

FIG. 8F illustrates a "places of interest" page displayed on a smartphone app according to embodiments of the present disclosure. The page allows a user to specify a location and a radius and displays to the user a list of places of interest within the radius of the location. The user may then select from the list locations from which the user wishes to see posts.

Figure 8G:
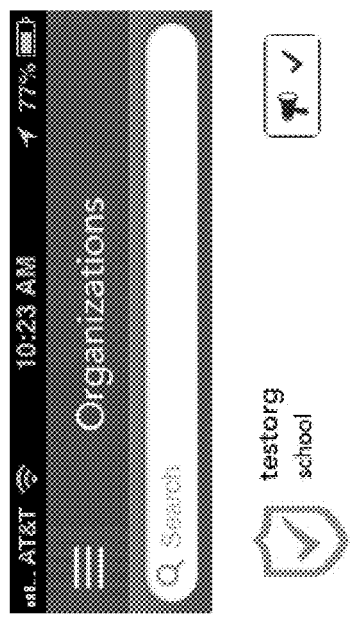

FIG. 8G illustrates an "organizations" page displayed on a smartphone app according to embodiments of the present disclosure. The page allows a user to search for and select organizations from which the user wishes to see posts. The page includes a text box into which the user can type a name or other identifying information of a desired organization. The page also includes a listing of names and types of organizations, and a graphical user interface button allowing the user to select whether to receive posts from a particular organization.

Figure 8H:

FIG. 8H illustrates a "settings" page displayed on a smartphone app according to embodiments of the present disclosure. The page allows a user to set an alert radius. The smartphone app will then display to the user only alerts sent from within the alert radius of the user's current location. The page also includes graphical user interface buttons allowing the user to elect to receive various types of notifications from each of the user's circles.

Any of the client or client/server devices described herein may have tangible computer readable media with logic, code, or instructions for performing any actions described herein or running any algorithm. The devices with such computer readable media may be specially programmed to perform the actions dictated by the computer readable media. In some embodiments, the devices may be specially programmed to perform one or more tasks relating to data management or analytics. In some embodiments, the devices may communicate with or receive data collected from one or more other devices or from a server configured on the network, which may collect data from a user or from a sample data set from a user. Information transmitted and shared may be by hard-lines, WIFI, and any other suitable data transmission means that can be received and transmitted by personal electronic devices.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that although certain of the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the invention have been described in detail herein, it is to be understood that the inventive concepts may be otherwise variously embodied and employed, and that the appended claims are intended to be construed to include such variations, except as limited by the prior art.

What is claimed is:

1. A non-transitory computer program product, including computer executable instructions stored onto a computer readable medium which, when executed by a user of a personal electronic device (PED), causes the PED to perform a method of sharing information with other user-selected PEDs that also utilize the computer program product, the non-transitory computer program product comprising:
   executable instructions that enable the user to define a community;
   executable instructions that permit other users of PEDs to join the user-defined community;
   executable instructions that enable users of PEDs to preselect at least one geographic area of interest;
   executable instructions that enables sharing of information to users of PEDs located within the preselected geographic area of interest;
   executable instructions for the user to identify user-selected PEDs within the community, regardless of proximity to the user or the at least one geographical area of interest;
   executable instructions that enable the PED of the user to receive alerts from the user-selected PEDs; and
   executable instructions that enable the user to send alerts to the user-selected PEDs,
   wherein the user can initiate the executable instruction to send information, whereby specific information of choice is sent from the user's PED to each of the user-selected PEDs and when any of the user-selected PEDs initiate the executable instruction to send information, the executable instructions to receive information, enable the PED of the user to receive the information sent.

2. The computer program product of claim 1, further comprising:
   executable instructions that enable the user of the PED to select at least one public information provider (PIP); and
   executable instructions that enable the user of the PED to receive information from the at least one PIP, wherever the PIP transmits information, wherein each of the user-selected PEDs also receive the information transmitted by the at least one PIP.

3. The computer program product of claim 2, further comprising executable instructions that enable the user of the PED to select a proximity relative to the at least one geographic area of interest, wherein when any user-selected PED and/or PIP transmits information within the proximity relative to the at least one geographic area of interest, the user's PED and the remaining user-selected PEDs receiving the transmitted information.

4. The computer program product of claim 1, further comprising executable instructions that enable the user to view information received from the user-selected PEDs in a single display page of the computer program product on the PED of the user.

5. The computer program product of claim 1, wherein the information sent from user-selected PEDs is one or more of emergency information, sighting information, and post information.

6. A system for sharing information between a user and members of a community comprising:
 a plurality of personal electronic devices, wherein at least one of the plurality of electronic devices is associated with at least one of each member of the community;
 at least one public information provider comprising a notification system for sending information to the individual and the members of the community; and
 computer executable instructions stored onto a computer readable medium located on each of the plurality of personal electronic devices and on each of the notification systems,
 wherein the computer executable instructions further comprise:
 executable instructions for the user to define the members of the community;
 executable instructions for the user to define the at least one public information provider;
executable instructions that enable users of personal electronic devices to preselect at least one geographic area of interest;
executable instructions that enables sharing of information to users of personal electronic devices located within the preselected geographic area of interest;
executable instructions for the user to identify user-selected personal electronic devices within the community, regardless of proximity to the user or the at least one geographical area of interest;
 executable instructions that enable the personal electronic device of the user to receive information from the personal electronic devices of the members of the community, and from the at least one public information provider notification system; and
 executable instructions that enable the user to send information to the personal electronic devices of the members of the community.

7. The system of claim 6, further comprising a wristband, wherein the wristband comprises a button and sends a distress signal to the personal electronic device of the user when the user presses the button, and wherein the personal electronic device of the user relays an alert to the personal electronic devices of the members of the community when the personal electronic device of the user receives the distress signal from the wristband.

8. The system of claim 6, further comprising a home siren capable of receiving information from the user, wherein the executable instructions further comprise executable instructions that enable the user to send a siren command to the home siren, and wherein the home siren emits a loud sound after receiving a siren command from the user.

9. A method for sharing information between a user and members of a community comprising:
 identifying a plurality of personal electronic devices, wherein at least one of the plurality of electronic devices is associated with at least one of each member of the community;
 providing at least one public information provider comprising a notification system for sending information to the individual and the members of the community;
 programming computer executable instructions onto a computer readable medium located on each of the plurality of personal electronic devices and on each of the notification systems; and
 utilizing the computer executable instructions to enable each of the following:
 the user can define the members of the community;
 the user can initiate sharing of information with the members of the community;
 the user can receive information shared by any member of the community;
 the user can preselect at least one geographic area of interest;
 the user can share information to users of personal electronic devices located within the preselected geographic area of interest;
 the user can identify personal electronic devices within the community, regardless of proximity to the user or the at least one geographical area of interest; and
 the user and each member of the community can receive information transmitted by the at least one public information provider.

10. A system for sharing information between a user and members of a community comprising:
 non-transitory computer executable instructions stored onto a computer readable medium which, when executed by a user of a personal electronic device (PED), causes the PED to share selected information with other user-selected PEDs, comprising:
 executable instructions for the user to define the members of the community;
 executable instructions for the user to define one or more user-selected PEDs;
 executable instructions that enable the PED of the user to receive information from the user-selected PEDs;
 executable instructions that enable the user to send information to the user-selected PEDs;
 executable instructions for the user to define at least one public information provider (PIP);
 executable instructions that enable the user of the PED and/or one or more user-selected PEDs to receive information from the at least one PIP;
 executable instructions that enable the user of the PED to select at least one geographic area of interest, wherein when any user-selected PED and PIP transmits information pertaining to the at least one geographic area of interest, the user's PED and the remaining user-selected PEDs receiving the transmitted information;
 executable instructions that enable the user to view information received from the user-selected PEDs in a single display page on the PED of the user;
 executable instructions that enable the personal electronic device of the user to receive information from the personal electronic devices of the members of the community; and
 executable instructions that enable the user to send information to the personal electronic devices of the members of the community;

at least one public information provider (PIP) comprising a notification system for sending information to the individual and the members of the community;

wherein the computer executable instructions are stored on a non-transitory computer readable medium, wherein the computer executable instructions are stored on each of the plurality of PEDs, and wherein the information sent from user-selected PEDs comprises one or more of emergency information, sighting information, and/or posted information; and wherein a user can initiate one or more executable instruction(s) to send selected information, whereby the information selected is sent from the user's PED to each of the user-selected PEDs and when any of the user-selected PEDs initiate the executable instruction to send information, the executable instructions to receive information, enable the PED of the user to receive the information sent to a plurality of personal electronic devices, and wherein at least one of the plurality of electronic devices is associated with at least one of each member of the community.

11. The system of claim 10, further comprising a wristband, wherein the wristband comprises at least one first button configured to send a first signal to the PED of the user and at least one user-selected PED of another member of the community when the user presses the button, and wherein the wristband further comprises at least one second button configured to send a second signal to the PEDs of all members of the community when the user presses the at least one second button, and wherein the wristband further comprises at least one indicia indicating the user wearing the wristband is a member of the community.

12. The system of claim 11, further comprising a home siren capable of receiving information from the user, wherein the executable instructions further comprise instructions that enable the user to send a siren command to the home siren, and wherein the home siren emits at least one audible signal after receiving the siren command from the user.

* * * * *